United States Patent Office.

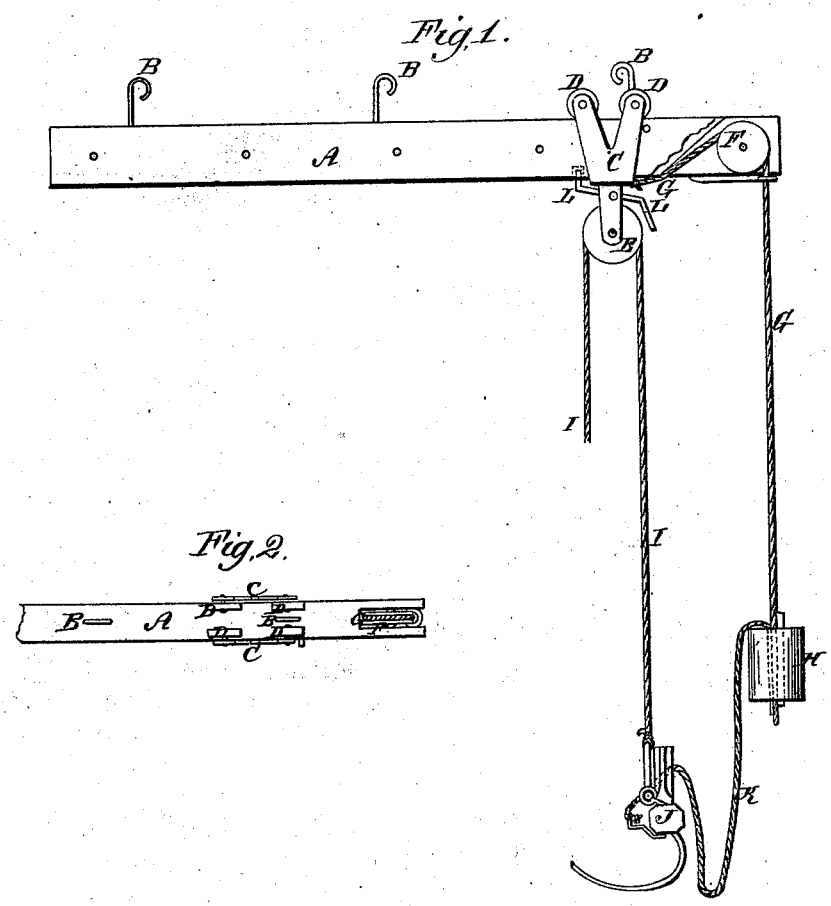

JOHN JAY REA, OF CADIZ, OHIO.

Letters Patent No. 83,319, dated October 20, 1868.

IMPROVEMENT IN ELEVATORS.

The Schedule referred to in these Letters Patent and making part of the same.

*To all whom it may concern:*

Be it known that I, JOHN JAY REA, of Cadiz, in the county of Harrison, and in the State of Ohio, have invented certain new and useful Improvements in Elevating and Transferring-Device; and do hereby declare that the following is a full, clear, and exact description thereof, reference being had to the accompanying drawings, and to the letters of reference marked thereon.

The nature of my invention consists in the construction and general arrangement of a device for elevating and transferring hay, grain, or other articles.

In order to enable others skilled in the art to which my invention appertains, to make and use the same, I will now proceed to describe its construction and operation, referring to the annexed drawings, which form a part of this specification, and in which—

Figure 1 is a side view, part in section, and
Figure 2 a plan view.

A represents a beam, which may be suspended, at any place desired, by hooks, B B, secured to the upper side of the beam, at or near the centre, which leaves room on each side of said hooks for the wheels of a truck, C, to move back and forth.

The truck C may be made of any shape desired, and suspended by two or more wheels, D D, which run on the upper side of the beam A.

The truck C extends downward below the beam, where a pulley, E, is placed.

At one end of the beam A is a pulley, F, over which a rope, G, is passed. This rope is attached to the truck, and at the other end, which hangs down from the said pulley, it is secured to a weight, H.

Over the pulley E, in the truck C, another rope, I, is passed, to one end of which a hay-fork, J, is secured, and the other end will be attached to the horse. A rope, K, is further secured to and connects the weight H with the hay-fork.

When the beam A is suspended, ready for operation, the weight H will carry the truck C to its place near the end of the beam, where it is held by a trigger, L, which, of its own weight, catches in a notch on the under side of the beam. The fork J is then inserted into the hay and properly set, the horse then started, which raises the hay-fork up until the knot on the rope I strikes the trigger L, which is then removed from the notch in the beam A. The truck then starts up the beam to the point where it is desired to unload the hay, when the trigger-rope K pulls the trigger which holds the fork, and trips the same, thus allowing the hay to fall off. The rope I then being slackened, the weight H carries the truck back to the point from whence it came, where it stops, and the fork descends again.

The ropes G and K are regulated in the weight H, to any length desired, by means of a wedge, the ropes being passed through a hole in the weight, and the wedge driven in, which secures them.

By this means, the point to which the truck will travel on the beam is regulated, and also the tripping of the fork.

I may dispense with the weight, in which case the ropes G and K will be attached to the end of the beam A, and the beam suspended slanting, so that the truck will move downwards on the same, of its own weight.

Having thus fully described my invention,

What I claim as new, and desire to secure by Letters Patent, is—

The beam A, hooks B B, forked truck C, provided with wheels D D and E, trigger L, pulley E, cords G K I, and weight H, all combined and operating substantially as herein set forth.

In testimony that I claim the foregoing, I have hereunto set my hand, this 11th day of September, 1868.

JOHN JAY REA.

Witnesses:
C. L. EVERT,
A. N. MARR.